US012784487B2

(12) United States Patent
Takeda et al.

(10) Patent No.: US 12,784,487 B2
(45) Date of Patent: Nov. 3, 2026

(54) WORKFLOW APPROVAL SYSTEM, APPROVAL ORDER SETTING METHOD, AND NON-TRANSITORY COMPUTER-READABLE STORAGE MEDIUM

(71) Applicant: SHARP KABUSHIKI KAISHA, Sakai City (JP)

(72) Inventors: Kenji Takeda, Sakai City (JP); Yuusuke Nakatani, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 263 days.

(21) Appl. No.: 18/542,633

(22) Filed: Dec. 16, 2023

(65) Prior Publication Data

US 2024/0203148 A1 Jun. 20, 2024

(30) Foreign Application Priority Data

Dec. 20, 2022 (JP) ................................ 2022-203420

(51) Int. Cl.
*G06V 30/416* (2022.01)
*G06Q 10/0633* (2023.01)
*G06V 30/414* (2022.01)

(52) U.S. Cl.
CPC ....... *G06V 30/416* (2022.01); *G06Q 10/0633* (2013.01); *G06V 30/414* (2022.01)

(58) Field of Classification Search
None
See application file for complete search history.

(56) References Cited

U.S. PATENT DOCUMENTS

2003/0177070 A1* 9/2003 Viswanath ............. G06Q 30/06 705/500
2019/0325213 A1* 10/2019 Numata ................ G06F 40/143
2019/0347299 A1* 11/2019 Kobayashi .............. G06F 16/93
2020/0097719 A1* 3/2020 Lodhia .................... G06F 18/21
2021/0042713 A1* 2/2021 Bag ........................ G06Q 30/04
2023/0316190 A1* 10/2023 Garrido .............. G06Q 10/0633 705/7.27

FOREIGN PATENT DOCUMENTS

CN 106408203 A * 2/2017 ......... G06Q 10/0633
JP 2008041006 A * 2/2008
JP 2009-069991 A 4/2009

* cited by examiner

*Primary Examiner* — Amandeep Saini
*Assistant Examiner* — Caroline Tabancay Duffy
(74) *Attorney, Agent, or Firm* — ScienBiziP, P.C.

(57) ABSTRACT

A workflow approval system includes an acquisition unit, a recognition unit, and a route setting unit. The acquisition unit acquires a first image. The recognition unit recognizes one or more approval fields included in the first image on the basis of the arrangement of a combination of characters included in the first image and a delimiting line that delimits a predetermined region in the first image. The route setting unit sets an approval order indicating the order of approvers who approve the first image, on the basis of the array of the one or more approval fields recognized by the recognition unit. The delimiting line includes one or more straight lines or one or more curved lines.

7 Claims, 12 Drawing Sheets

WORKFLOW APPROVAL SYSTEM, APPROVAL ORDER SETTING METHOD, AND NON-TRANSITORY COMPUTER-READABLE STORAGE MEDIUM

INCORPORATION BY REFERENCE

This application claims the benefit of priority under 35 U.S.C. 119 based on Japanese Patent Application No. 2022-203420 filed on Dec. 20, 2022, the entire contents of which are incorporated herein by reference.

BACKGROUND

The present disclosure relates to a workflow approval system, an approval order setting method, and an approval order setting program.

In the related art, there is known an information processing apparatus that extracts necessary information from image data obtained by reading a paper document and determines a workflow necessary for processing the paper document by referring to information on a workflow registered in advance. Further, the information processing apparatus extracts the image data of the imprint field from the image data, determines the processing stage in the workflow by referring to the information on the processing stage of the workflow registered in advance, and transmits the image data of the paper document to another corresponding information processing apparatus.

SUMMARY

A workflow approval system according to the present disclosure includes an acquisition unit, a recognition unit, and a route setting unit. The acquisition unit acquires a first image. The recognition unit recognizes one or more approval fields included in the first image on the basis of the arrangement of a combination of characters included in the first image and a delimiting line delimiting a predetermined region in the first image. The route setting unit sets an approval order indicating the order of approvers who approve the first image, on the basis of the array of the one or more approval fields recognized by the recognition unit. The delimiting line includes one or more straight lines or one or more curved lines.

An approval order setting method according to the present disclosure includes acquiring, by an acquisition unit, a first image, recognizing, by a recognition unit, one or more approval fields included in the first image on a basis of an arrangement of a combination of characters included in the first image and a delimiting line delimiting a predetermined region in the first image, and setting, by a route setting unit, an approval order indicating an order of approvers who approve the first image, on a basis of an array of the recognized one or more approval fields. The delimiting line includes one or more straight lines or one or more curved lines.

A non-transitory computer-readable storage medium according to the present disclosure stores an approval order setting program that is executed by a computer. The approval order setting program causes the computer to function as an acquisition unit that acquires a first image, a recognition unit that recognizes one or more approval fields included in the first image on a basis of an arrangement of a combination of characters included in the first image and a delimiting line delimiting a predetermined region in the first image; and a route setting unit that sets an approval order indicating an order of approvers who approve the first image, on a basis of an array of the one or more approval fields recognized by the recognition unit. The delimiting line includes one or more straight lines or one or more curved lines.

DETAILED DESCRIPTION

Figure 1:
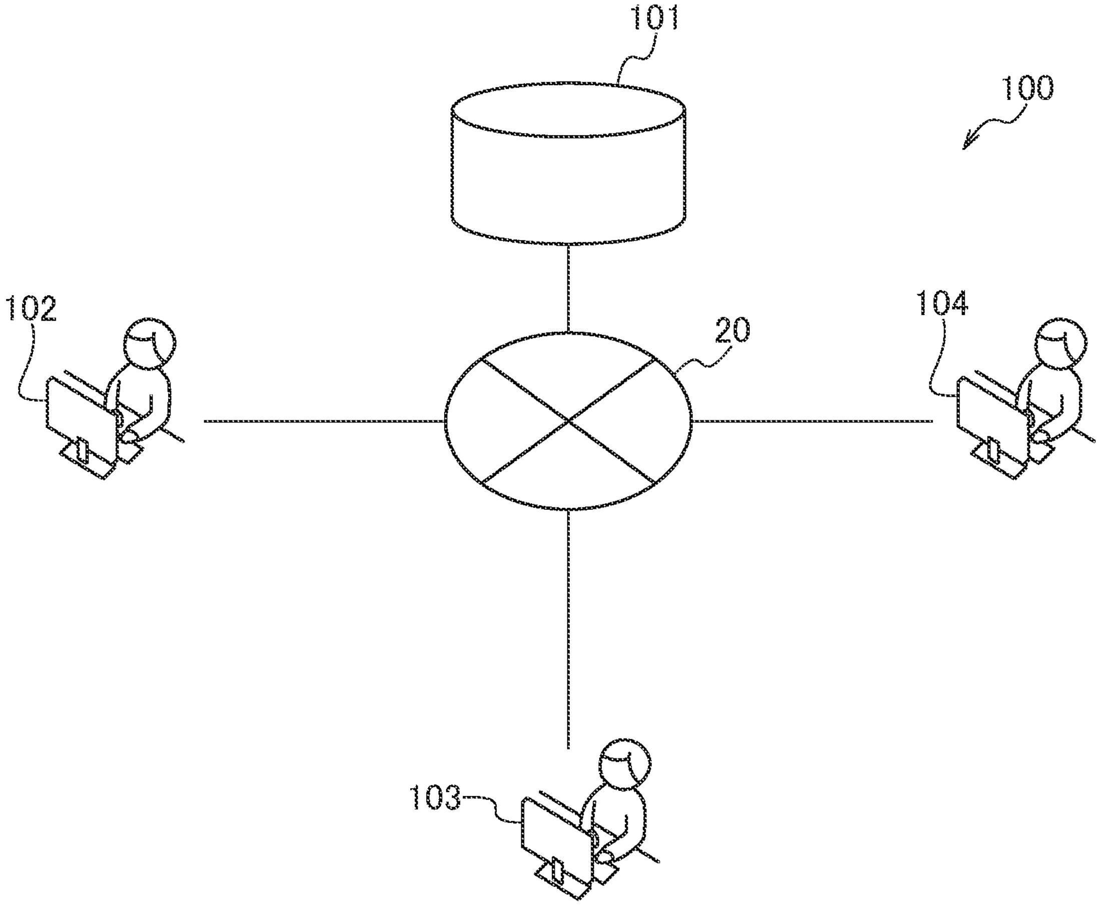
FIG. 1 is a diagram illustrating a workflow approval system according to the present embodiment.

An embodiment of the present disclosure will be described below with reference to drawings. In the drawings, the same or corresponding parts are denoted by the same reference numerals, and thus the description thereof is not repeated.

A configuration of a workflow approval system 100 according to the present embodiment will be described with reference to FIG. 1. FIG. 1 is a diagram illustrating the workflow approval system 100 according to the present embodiment. As illustrated in FIG. 1, the workflow approval system 100 includes an information processing apparatus 101, three operation terminals 102, 103, and 104, and a network 20. The number of operation terminals included in the workflow approval system 100 is not limited to three. In the workflow approval system 100, for example, the operation terminals 103 and 104 perform approval processing in response to application processing in the operation terminal 102. In the present embodiment, the user of the operation terminal 102 is an applicant of a workflow, and the users of the operation terminals 103 and 104 are approvers of the workflow.

The information processing apparatus 101, the operation terminal 102, the operation terminal 103, and the operation terminal 104 can communicate with one another via the network 20. The network 20 may include, for example, at least one of a local area network (LAN), a wireless LAN, a mobile phone communication network, infrared communication, Bluetooth®, and the like.

The operation terminals 102, 103, and 104 are terminals used by the users, and may be, for example, desktop personal computers, notebook personal computers, tablet terminals, or smartphones. Each of the operation terminals 102, 103, and 104 includes an operation unit, a display unit, a control unit, and a storage unit (that are not illustrated).

The operation unit includes a keyboard, a mouse, a trackpad, and the like. The operation unit accepts an operation of a user (applicant) on the operation terminal 102. The operation unit of the operation terminal 102 is an example of a first acceptance unit 21.

The display unit includes, for example, a liquid crystal display and an organic electroluminescence display. The control unit includes, for example, one or more processors such as central processing units (CPUs).

The storage unit includes a storage device such as a semiconductor memory and a hard disk drive (HDD). The storage unit stores data, computer programs, and the like.

The control unit controls the operation unit, the display unit, and the storage unit. Further, the control unit transmits and receives various kinds of data to and from the information processing apparatus 101 or another operation terminal via the network 20.

Figure 2:
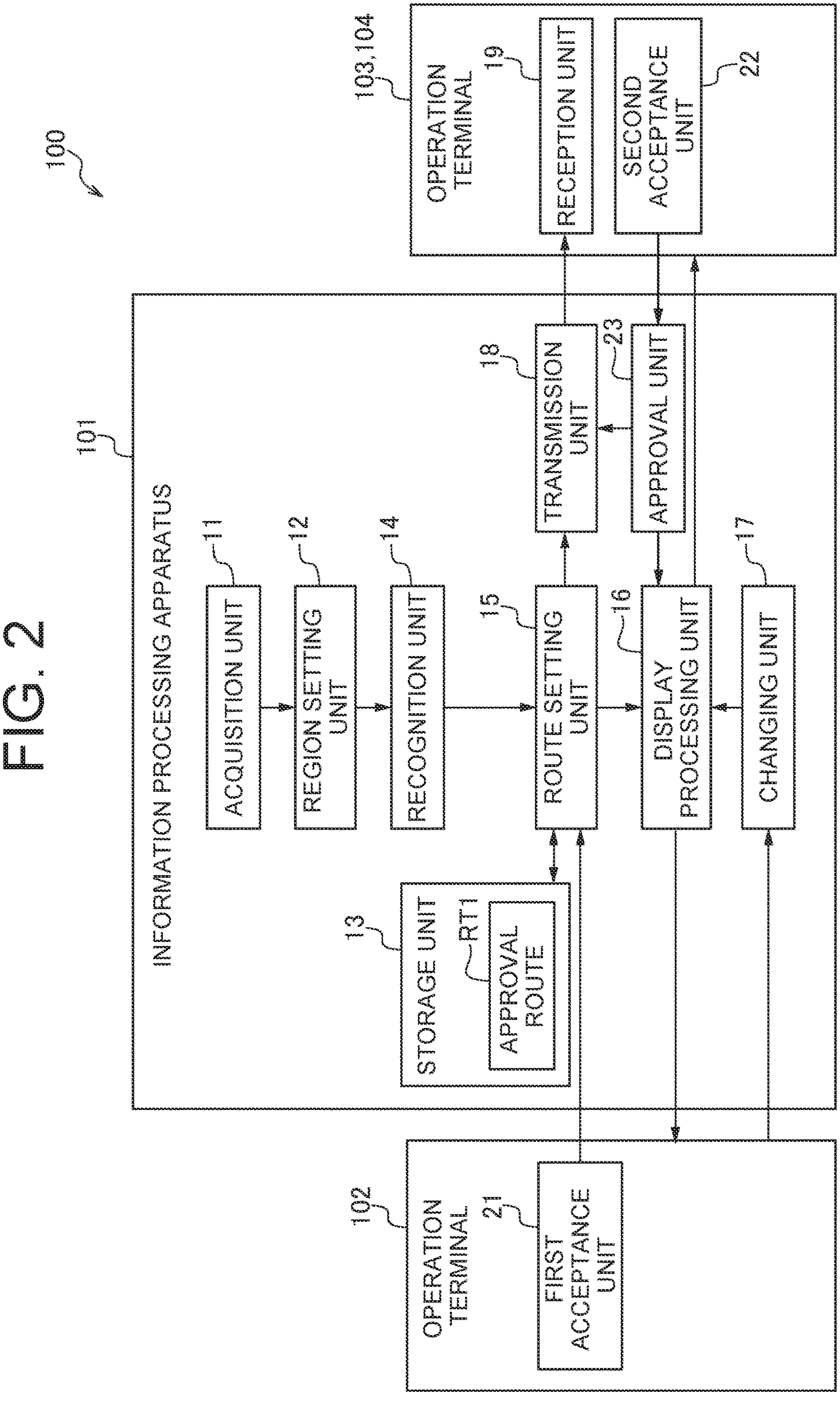
FIG. 2 is a functional block diagram of an information processing apparatus according to the present embodiment.
Figure 3:
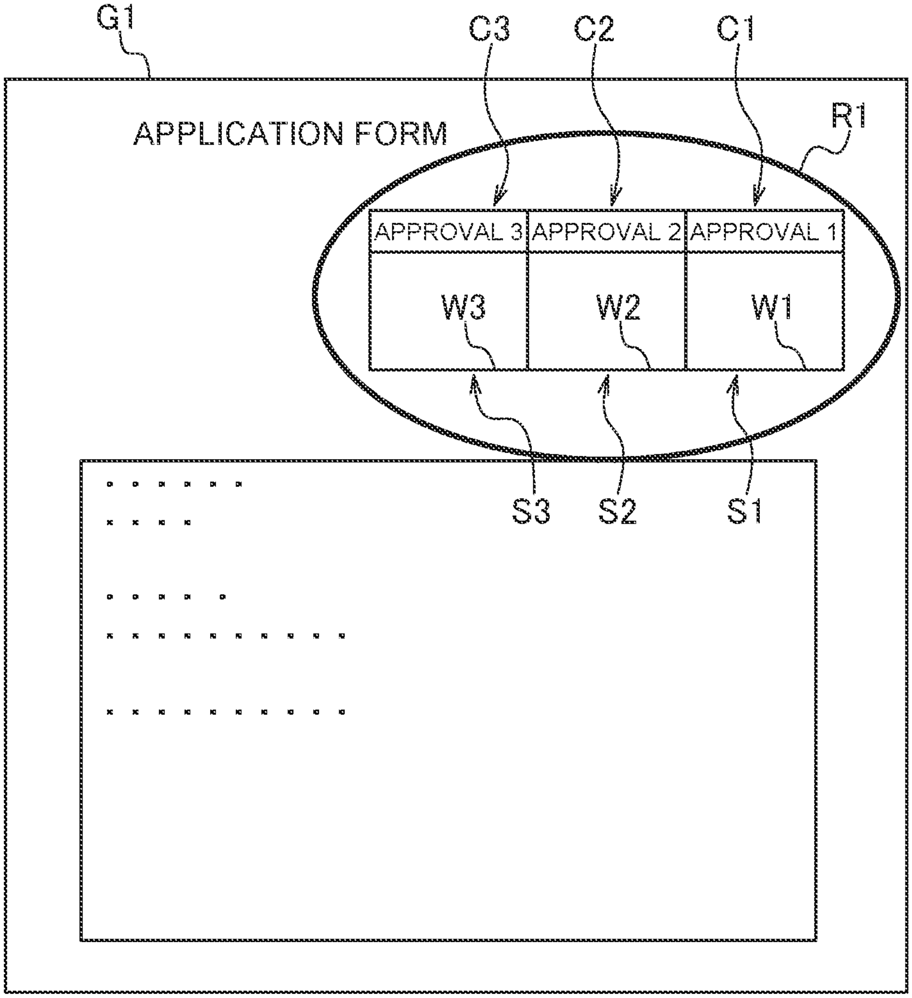
FIG. 3 is a diagram illustrating an example of a first image acquired in the information processing apparatus according to the present embodiment.

Next, the information processing apparatus 101 according to the present embodiment will be described with reference to FIGS. 2 and 3. FIG. 2 is a functional block diagram of the information processing apparatus 101 according to the present embodiment. FIG. 3 is a diagram illustrating an example of the first image acquired in the information processing apparatus 101 according to the present embodiment.

The information processing apparatus 101 may be, for example, a server. The information processing apparatus 101 includes an acquisition unit 11, a region setting unit 12, a storage unit 13, a recognition unit 14, a route setting unit 15, a display processing unit 16, a changing unit 17, a transmission unit 18, and an approval unit 23. The information processing apparatus 101 includes one or more processors such as central processing units (CPUs) and a communication module that transmits and receives various data to and from each operation terminal via the network 20. The storage unit 13 includes a storage device such as a semiconductor memory and a hard disk drive (HDD). The storage unit 13 stores data, computer programs, and the like. The computer program includes an approval order setting program. One or more processors of the information processing apparatus 101 function as the acquisition unit 11, the region setting unit 12, the recognition unit 14, the route setting unit 15, the display processing unit 16, the changing unit 17, and the transmission unit 18 by executing the approval order setting program stored in the storage unit 13. In this way, some or all of the acquisition unit 11, the region setting unit 12, the recognition unit 14, the route setting unit 15, the display processing unit 16, the changing unit 17, and the transmission unit 18 included in the information processing apparatus 101 are configured with an electronic circuit. The transmission unit 18 controls transmission processing by the communication module.

When the application processing is started in the operation terminal 102, the operation terminal 102 generates a first image G1 indicating an application form. The acquisition unit 11 acquires the first image G1. Specifically, when the communication module of the information processing apparatus 101 receives the first image G1 transmitted from the operation terminal 102 to the information processing apparatus 101, the acquisition unit 11 acquires the first image G1 received by the communication module. The first image G1 may be stored in the storage unit 13 in advance, instead of being transmitted from the operation terminal 102. In this case, the acquisition unit 11 acquires the first image G1 from the storage unit 13.

The display processing unit 16 displays the first image G1 on the display unit of the operation terminal 102. Specifically, the display processing unit 16 transmits the first image G1 and an instruction to display the first image G1 on the display unit of the operation terminal 102 to the operation terminal 102 via the communication module. The control unit of the operation terminal 102 receives the first image G1 and the instruction transmitted from the display processing unit 16, and displays the first image G1 on the display unit in accordance with the instruction.

In this state, when the operation unit of the operation terminal 102 accepts an operation of the user (applicant) on the operation terminal 102, the control unit of the operation terminal 102 transmits an instruction corresponding to the operation of the applicant to the information processing apparatus 101. One or more processors of the information processing apparatus 101 receive the instruction from the operation terminal 102 via the communication module and control the information processing apparatus 101 in accordance with the received instruction.

As illustrated in FIG. 3, the first image G1 includes, for example, three approval fields S1, S2, and S3.

When receiving selection information indicating a partial region of the first image G1 selected by a drag operation of a mouse or a touch operation of a trackpad by the applicant transmitted from the operation terminals 102 via the communication module, the region setting unit 12 sets the partial region of the first image G1 as a target region R1 on the basis of the selection information. In the example illustrated in FIG. 3, suppose that a circular region including three approval fields S1, S2, and S3 is selected in the first image G1.

The recognition unit 14 recognizes one or more approval fields included in the first image G1 on the basis of the arrangement of a combination of characters included in the first image G1 and a delimiting line that delimits a predetermined region in the first image G1. The delimiting line includes one or more straight lines or one or more curved lines. For example, the delimiting line includes a frame line surrounding the predetermined region with one or more straight lines or one or more curved lines. Specifically, the recognition unit 14 performs image processing on the target region R1 of the first image G1, and determines that the target region R1 includes three characters C1, C2, and C3 arranged side by side in the horizontal direction and that there are frame lines W1, W2, and W3 below each of the characters C1, C2, and C3, on the basis of the color and coordinates of each pixel included in the target region R1. The recognition unit 14 recognizes that the frame line W1 below the character C1 is the approval field S1, the frame line W2 below the character C2 is the approval field S2, and the frame line W3 below the character C3 is the approval field S3, on the basis of the positional relation among the three characters C1, C2, and C3 and the frame lines W1, W2, and W3. The arrangement of the combination of the characters and the frame line in the target region R1 is not limited to the example illustrated in FIG. 3.

Figure 4:
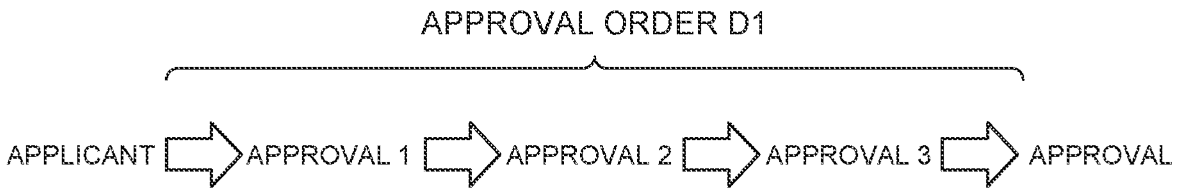
FIG. 4 is a diagram illustrating an approval order in the workflow approval system according to the present embodiment.

Next, an approval order D1 set in the workflow approval system 100 according to the present embodiment will be described with reference to FIGS. 2 to 4. FIG. 4 is a diagram illustrating the approval order D1 in the workflow approval system 100 according to the present embodiment.

The route setting unit 15 illustrated in FIG. 2 sets the approval order D1 indicating the order of approvers who approve the first image G1, on the basis of the array of the approval fields S1, S2, and S3 recognized by the recognition unit 14.

For example, as illustrated in FIG. 3, since the character C1 “approval 1”, the character C2 “approval 2”, and the character C3 “approval 3” are arranged in ascending order from right to left in the target region R1, the route setting unit 15 sets the approval order D1 in the order of “approval 1”, “approval 2”, and “approval 3”. Specifically, the route setting unit 15 sets “approval 1” as the first approver, “approval 2” as the second approver, and “approval 3” as the third approver. The route setting unit 15 may set the approval order D1 in the order of, for example, “approval 3”, “approval 2”, and “approval 1” even in the case of the arrangement of characters illustrated in FIG. 3.

Figure 5:
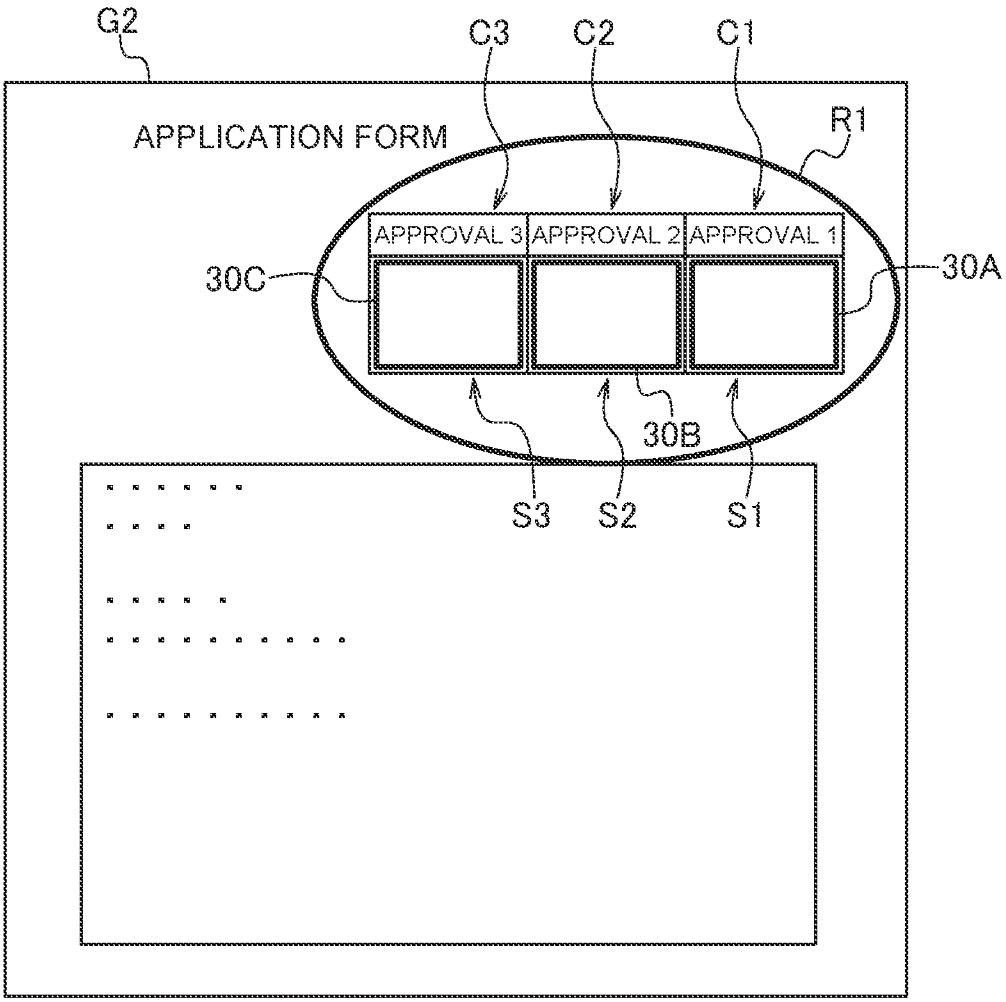
FIG. 5 is a diagram illustrating an example of a second image including an approval field image indicating an approval field.

Next, with reference to FIGS. 2 and 5, a method for confirming the approval field and the approval order D1 in the workflow approval system 100 according to the present embodiment will be described. FIG. 5 is a diagram illustrating an example of a second image G2 including an approval field image 30 indicating an approval field.

As illustrated in FIGS. 2 and 5, the display processing unit 16 generates the second image G2 in which the approval field images 30A, 30B, and 30C which are the approval field images 30 respectively corresponding to the approval fields S1, S2, and S3 recognized by the recognition unit 14 are superimposed on the first image G1, and displays the second image G2 on the display unit of the operation terminal 102.

For example, the display processing unit 16 generates the approval field images 30A, 30B, and 30C having shapes and sizes respectively corresponding to the approval fields S1, S2, and S3, and arranges the generated approval field images 30A, 30B, and 30C at the positions of the approval fields S1, S2, and S3 in the first image G1. The display processing unit 16 generates the second image G2 in which the approval field images 30A, 30B, and 30C are arranged in the first image G1, stores the second image G2 in the storage unit 13, and transmits the second image G2 to the operation terminal 102 via the communication module. The control unit of the operation terminal 102 receives the second image G2 transmitted by the display processing unit 16, and displays the second image G2 on the display unit.

Here, for example, due to erroneous recognition of characters or frame lines in the target region R1 by the recognition unit 14, the approval field images 30A, 30B, and 30C may not be correctly arranged at the positions of the approval fields S1, S2, and S3 in the first image G1.

Figure 6:
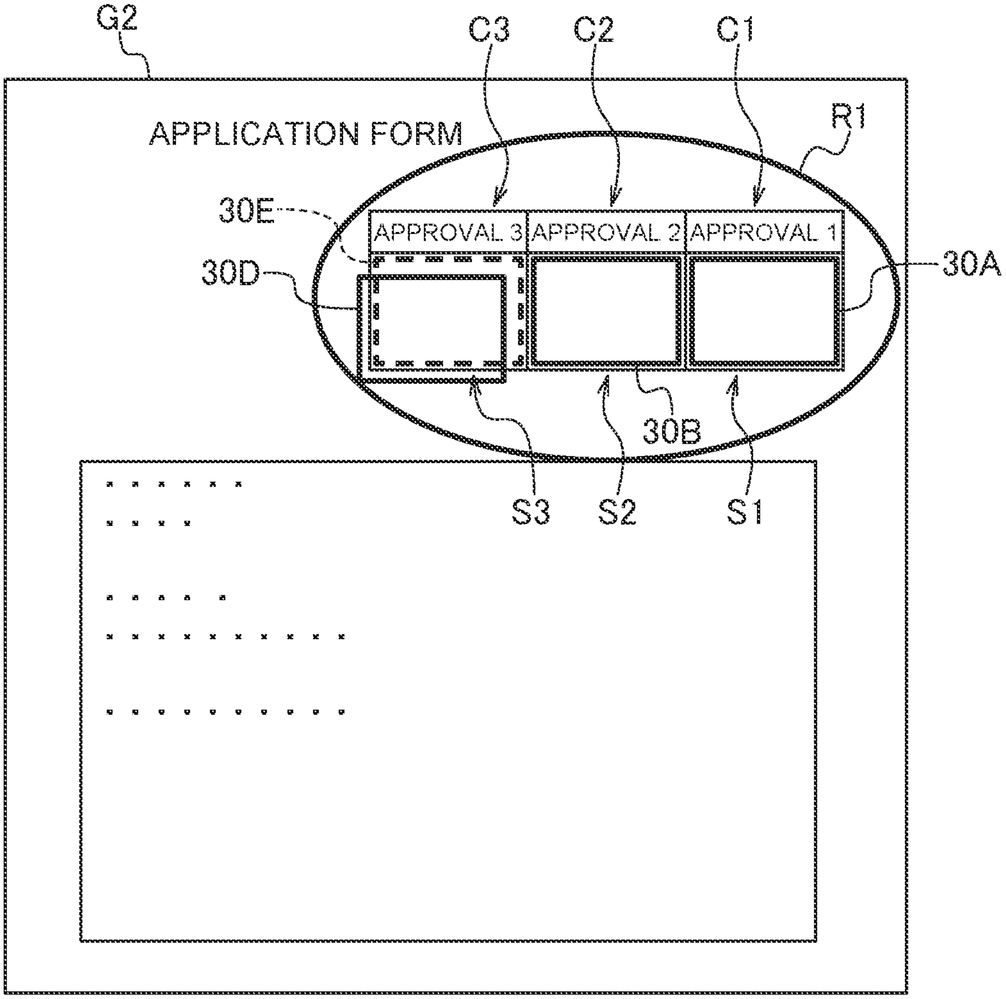
FIG. 6 is a diagram illustrating another example of the second image in the workflow approval system according to the present embodiment.

Next, the adjustment of the approval field image 30 in the second image G2 will be described with reference to FIG. 6. FIG. 6 is a diagram illustrating another example of the second image G2 in the workflow approval system 100 according to the present embodiment. The second image G2 illustrated in FIG. 6 includes an approval field image 30D instead of the approval field image 30C, as compared with the second image G2 illustrated in FIG. 3. The approval field image 30D is arranged at a position outside the approval field S3.

The changing unit 17 illustrated in FIG. 2 changes at least one of the positions at which the approval field image 30 is superimposed and the shape of the approval field image 30, in accordance with the operation of the user (applicant) of the operation terminal 102.

For example, the applicant operates a mouse, a trackpad, or the like to select the approval field image 30D of the second image G2 displayed on the display unit of the operation terminal 102. Further, the applicant operates the mouse, the trackpad, or the like to input, to the operation terminal 102, an instruction to change the position of the approval field image 30D in the second image G2 or the size of the approval field image 30D.

The operation terminal 102 transmits the input instruction to the information processing apparatus 101. The changing unit 17 of the information processing apparatus 101 receives the instruction from the operation terminal 102 via the communication module. The changing unit 17 updates the second image G2 in the storage unit 13 in accordance with the received instruction. Specifically, the changing unit 17 changes the position of the approval field image 30D in the second image G2 or the size of the approval field image 30D in the second image G2 in the storage unit 13 in accordance with the received instruction.

In FIG. 6, the approval field image 30D after the position is moved by the operation of the applicant is indicated by a dashed line as an approval field image 30E. For example, the display processing unit 16 displays the second image G2 after the changing processing by the changing unit 17 on the display unit of the operation terminal 102.

Figure 7:
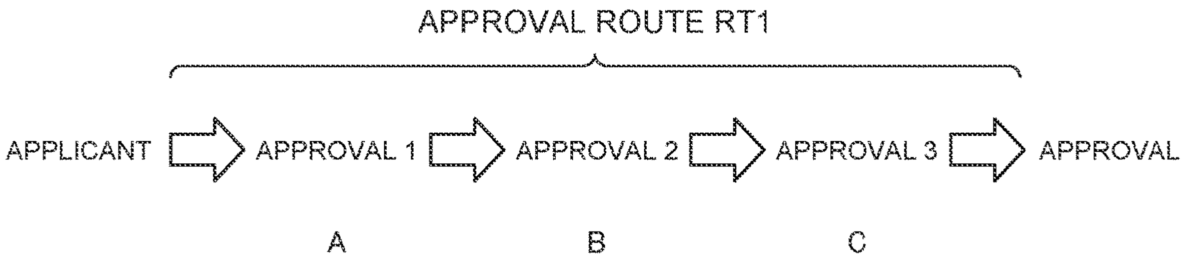
FIG. 7 is a diagram illustrating an approval route in the workflow approval system according to the present embodiment.

Next, setting of an approval route RT1 in the workflow approval system 100 according to the present embodiment will be described with reference to FIGS. 2 and 7. FIG. 7 is a diagram illustrating the approval route RT1 in the workflow approval system 100 according to the present embodiment.

The route setting unit 15 illustrated in FIG. 2 assigns a target person to the approval order D1. For example, the user (applicant) of the operation terminal 102 inputs identification information indicating a target person to be assigned to the approval order D1 to the operation terminal 102. Specifically, the applicant inputs the identification information indicating a target person “A” and the assignment information indicating that the assignment destination of the target person “A” is “approval 1” of the approval order D1. Further, the applicant inputs the identification information indicating a target person “B” and the assignment information indicating that the assignment destination of the target person “B” is “approval 2” of the approval order D1. Further, the applicant inputs the identification information indicating a target person “C” and the assignment information indicating that the assignment destination of the target person “C” is “approval 3” of the approval order D1. The identification information is, for example, a personal ID or an e-mail address.

The operation unit of the operation terminal 102 receives an input operation of the identification information and the assignment information by the user. The control unit of the operation terminal 102 transmits the input identification information and assignment information to the information processing apparatus 101.

The route setting unit 15 of the information processing apparatus 101 receives the identification information and the assignment information transmitted from the operation terminal 102 via the communication module. The route setting unit 15 sets the identification information indicating the target person “A” in “approval 1” of the approval order D1 on the basis of the identification information and the assignment information. Further, the route setting unit 15 sets the identification information indicating the target person “B” in “approval 2” of the approval order D1 on the basis of the identification information and the assignment information.

Furthermore, the route setting unit 15 sets the identification information indicating the target person "C" in "approval 3" of the approval order D1 on the basis of the identification information and the assignment information.

The route setting unit 15 stores the approval order D1 in which the identification information has been set, in the storage unit 13 as the approval route RT1. The route setting unit 15 may include a personal ID, a mail addresses, or the like of the applicant in the approval route RT1 as information indicating the applicant of the workflow.

Next, a workflow approval processing in the workflow approval system 100 will be described.

In the present embodiment, when an approval is requested for a generated application form, image information indicating the application form is sequentially transmitted to an approver. Specifically, the transmission unit 18 illustrated in FIG. 2 controls the communication module to transmit second image information J2 corresponding to the second image G2 generated by the display processing unit 16 to the target person assigned to the approval route RT1 in accordance with the approval order D1. The second image information J2 includes binary data indicating the second image G2 or information indicating a hyperlink corresponding to the second image G2.

The transmission unit 18 refers to the second image G2 in the storage unit 13, and identifies the blank and forefront approval field among the approval fields S1, S2, and S3 in the second image G2. For example, the transmission unit 18 determines the colors of the pixels corresponding to the approval fields S1, S2, and S3, and determines that each of the approval fields S1, S2, and S3 is blank when all the pixels included in each of the approval fields S1, S2, and S3 have the same color. The transmission unit 18 refers to the approval route RT1 in the storage unit 13 and identifies the approval field corresponding to the approver (target person) arranged at the forefront of the approval route RT1 among the approval fields S1, S2, and S3 determined to be blank. For example, when the second image G2 is not approved by any of the approvers, the transmission unit 18 identifies the approval field S1. The transmission unit 18 acquires identification information indicating the target person "A" corresponding to the identified approval field S1 on the basis of the approval route RT1. The transmission unit 18 transmits the second image information J2 to the target person "A" on the basis of the acquired identification information.

In the present embodiment, it is assumed that the operation terminal 103 (FIG. 1) is an operation terminal of the target person "A". The control unit of the operation terminal 103 receives the second image information J2 transmitted by the transmission unit 18 of the information processing apparatus 101. The control unit of the operation terminal 103 is an example of a reception unit 19 illustrated in FIG. 2. When receiving the second image information J2, the control unit of the operation terminal 103 generates, for example, a notification screen V1 that notifies the reception of the second image information J2, and displays the notification screen V1 on the display unit of the operation terminal 103.

Figure 8:
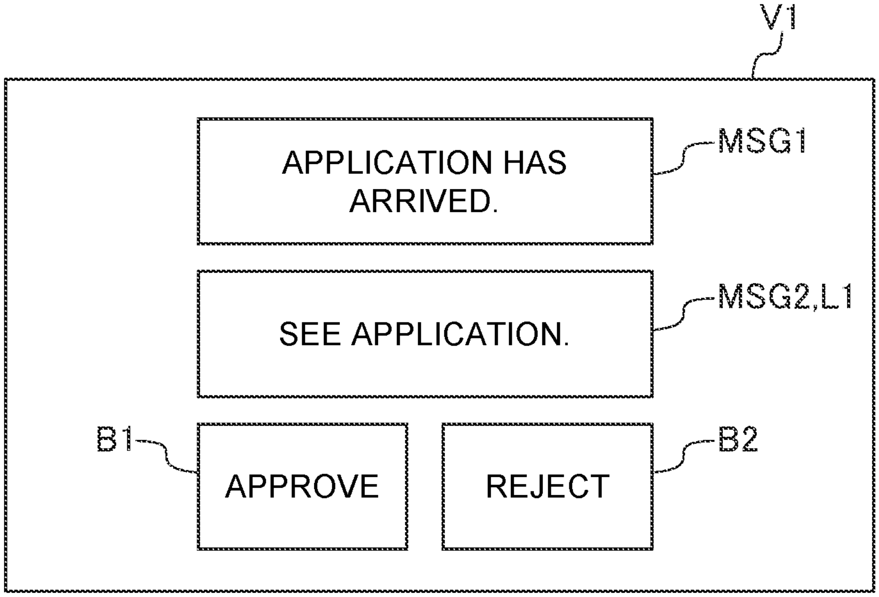
FIG. 8 is a diagram illustrating a notification screen displayed in a display unit in the workflow approval system according to the present embodiment.

Next, the notification screen V1 displayed on the display unit in the workflow approval system 100 according to the present embodiment will be described with reference to FIG. 8. FIG. 8 is a diagram illustrating the notification screen V1 displayed on the display unit in the workflow approval system 100 according to the present embodiment.

As illustrated in FIG. 8, the notification screen V1 includes a first message image MSG1, a second message image MSG2, an approval button image B1, and a rejection button image B2.

The first message image MSG1 is an image including a message notifying the reception of the second image information J2 "application has arrived". The second message image MSG2 is an image indicating the second image information J2. For example, when the second image information J2 is information indicating a hyperlink L1 corresponding to the second image G2, the hyperlink L1 is arranged in the notification screen V1 as the second message image MSG2.

For example, when the target person "A" who is the approver taps or clicks the second message image MSG2 by operating a mouse, a trackpad, or the like, the control unit of the operation terminal 103 controls the display unit of the operation terminal 103 to display the second image G2 instead of the notification screen V1.

The approval button image B1 indicates a button to be pressed when the approver approves the application form. The rejection button image B2 indicates a button to be pressed when the approver does not approve the application form and returns the application form to the applicant.

When the approver approves the application form, the approver taps or clicks the approval button image B1 by operating the mouse, the trackpad, or the like. The operation unit of the operation terminal 103 accepts an operation by the approver. The operation unit of the operation terminal 103 is an example of a second acceptance unit 22. The control unit of the operation terminal 103 transmits approval information AP1 indicating that the application form is approved by the target person "A" to the information processing apparatus 101 in response to an operation of tapping or clicking the approval button image B1 accepted by the operation unit.

Figure 9:
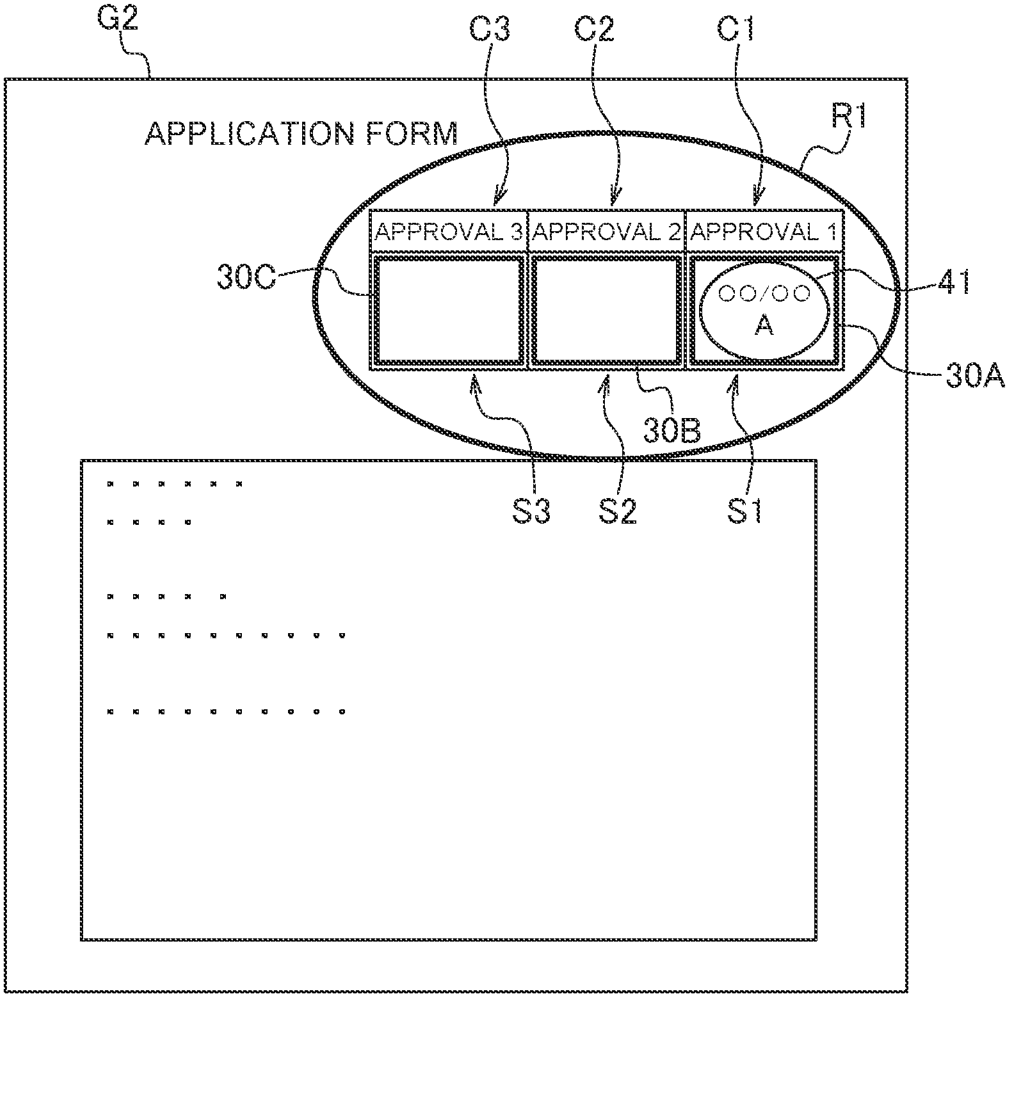
FIG. 9 is a diagram illustrating a second image after approval by a first target person.

Next, the second image G2 after approval by the target person "A" who is the first approver will be described with reference to FIG. 9. FIG. 9 is a diagram illustrating the second image G2 after approval by the first approver.

The approval unit 23 of the information processing apparatus 101 illustrated in FIG. 2 receives the approval information AP1 transmitted from the operation terminal 103. The approval unit 23 adds the approval image to the approval field S1 corresponding to the target person "A" among the approval fields S1, S2, and S3 included in the second image G2 in the storage unit 13 illustrated in FIG. 9, on the basis of the received approval information AP1. Specifically, the approval unit 23 refers to the approval route RT1 in the storage unit 13 and identifies that the target person "A" is assigned to "approval 1", on the basis of the approval information AP1. The approval unit 23 refers to the second image G2 and identifies that the approval field corresponding to the identified "approval 1" is the approval field S1. In addition, the approval unit 23 identifies the coordinates of the approval field image 30A corresponding to the approval field S1 included in the second image G2.

The approval unit 23 generates an approval image 41 indicating the target person "A", arranges the generated approval image 41 at the position of the approval field S1 in the second image G2 on the basis of the identified coordinates of the approval field image 30A, and updates the second image G2. The approval image 41 is, for example, an electronic mark. The approval image 41 may be text data indicating the target person "A", an icon, or the like, other than the electronic mark.

When the approval image 41 is added to the second image G2 by the approval unit 23, the transmission unit 18 controls the communication module to transmit the second image information J2 to the target person corresponding to the approval field to which the approval image 41 is not added.

The transmission unit 18 refers to the second image G2 in the storage unit 13 and identifies the approval field indicating the next approver of the approver corresponding to the approval field to which the approval image 41 has been added among the approval fields S1, S2, and S3 in the second image G2. In the example illustrated in FIG. 9, the transmission unit 18 identifies the approval field S2 indicating "approval 2" which is the next approver of "approval 1" corresponding to the approval field S1 to which the approval image 41 has been added. The transmission unit 18 refers to the approval route RT1 in the storage unit 13 and acquires the identification information indicating the target person "B" corresponding to the identified approval field S2. The transmission unit 18 transmits the second image information J2 to the target person "B" on the basis of the acquired identification information.

In the present embodiment, it is assumed that the operation terminal 104 (FIG. 1) is the operation terminal of the target person "B". The processing in the operation terminal 104 and the operation of the target person "B" on the operation terminal 104 are the same as the processing in the operation terminal 103 and the operation of the target person "A" on the operation terminal 103, respectively, and thus the description thereof will be omitted.

Further, in the operation terminal 104, the processing of the approval unit 23 and the transmission unit 18 of the information processing apparatus 101 after the application form is approved by the target person "B" is the same as the processing after the approval process by the target person "A", and thus the description thereof will be omitted.

In the present embodiment, after the approval process by the target person "B", the transmission unit 18 transmits the second image information J2 to the target person "C". The processing in the operation terminal of the target person "C" (not illustrated) and the operation of the target person "C" on the operation terminal (not illustrated) are the same as the processing in the operation terminal 104 and the operation of the target person "B" on the operation terminal 104, respectively, and thus the description thereof will be omitted.

The transmission unit 18 refers to the second image G2 in the storage unit 13, determines that the approval image 41 is added to all of the approval fields S1, S2, and S3 in the second image G2, and notifies the approver of the completion of the approval.

For example, when determining that the approval image 41 is added to all of the approval fields S1, S2, and S3 in the second image G2, the transmission unit 18 refers to the approval route RT1 in the storage unit 13 and acquires information indicating the applicant included in the approval route RT1.

The transmission unit 18 transmits, for example, a message notifying completion of approval to the applicant on the basis of the acquired information indicating the applicant.

[Variation of Approval Route RT1 Setting]

In the present embodiment, the target person may be assigned to the approval order D1 by referring to the approval route RT1 that has been stored in the storage unit 13, in addition to the assignment of the target person to the approval order D1 by the applicant inputting the identification information indicating the target person.

For example, when a new approval order D2 is set, the route setting unit 15 refers to the storage unit 13. When the approval route RT1 is stored in the storage unit 13, the route setting unit 15 acquires the approval route RT1 from the storage unit 13 and compares the approval order D1 of the approval route RT1 with the approval order D2. When determining that the approval order D1 and the approval order D2 are the same, the route setting unit 15 acquires a plurality of pieces of identification information set in the approval route RT1 and assignment information indicating assignment destinations respectively corresponding to the plurality of pieces of identification information. The route setting unit 15 sets the plurality of pieces of identification information in the approval order D2 on the basis of the acquired plurality of pieces of identification information and assignment information.

Figure 10:
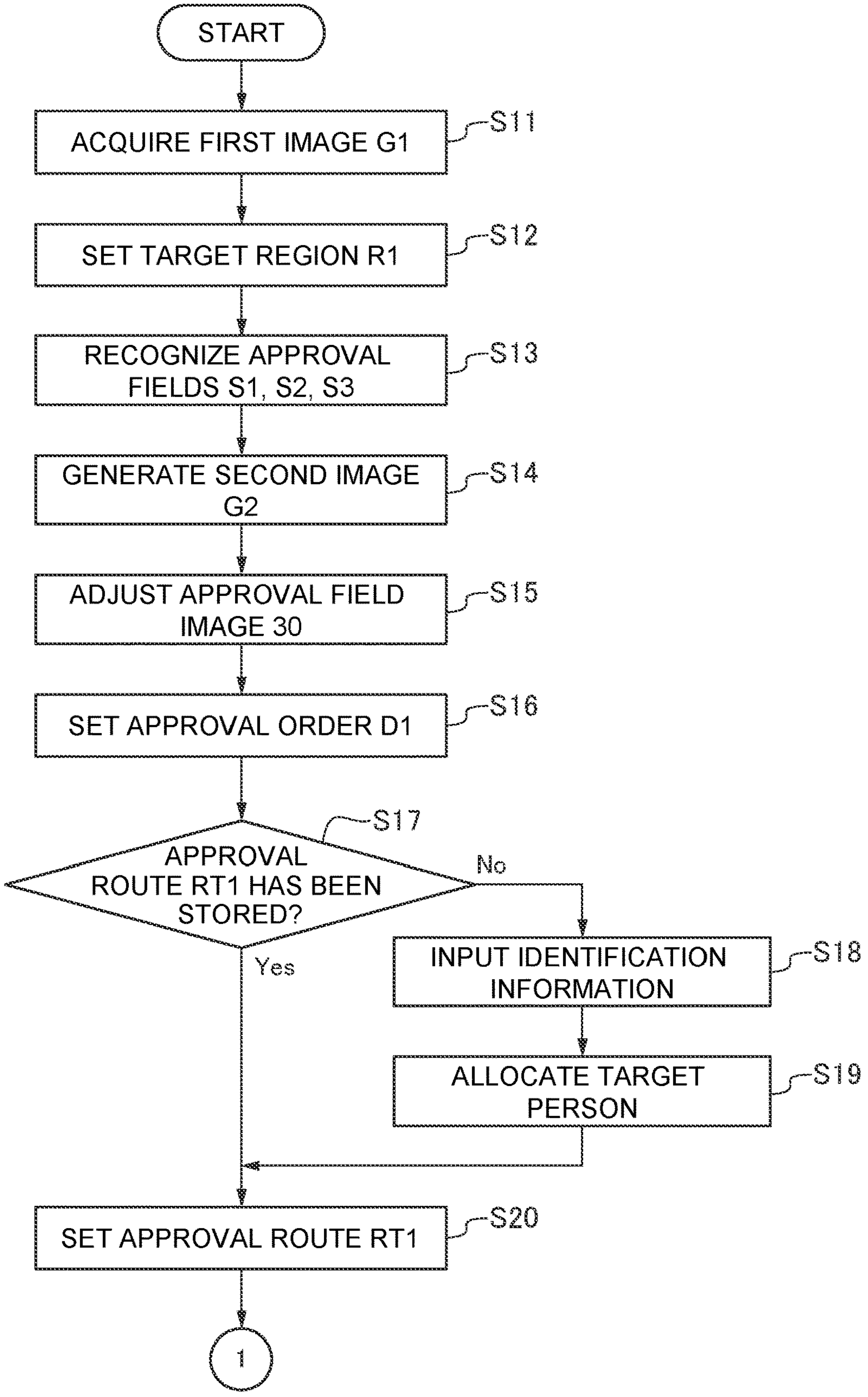
FIG. 10 is a flowchart illustrating a workflow approval method according to the present embodiment.
Figure 11:
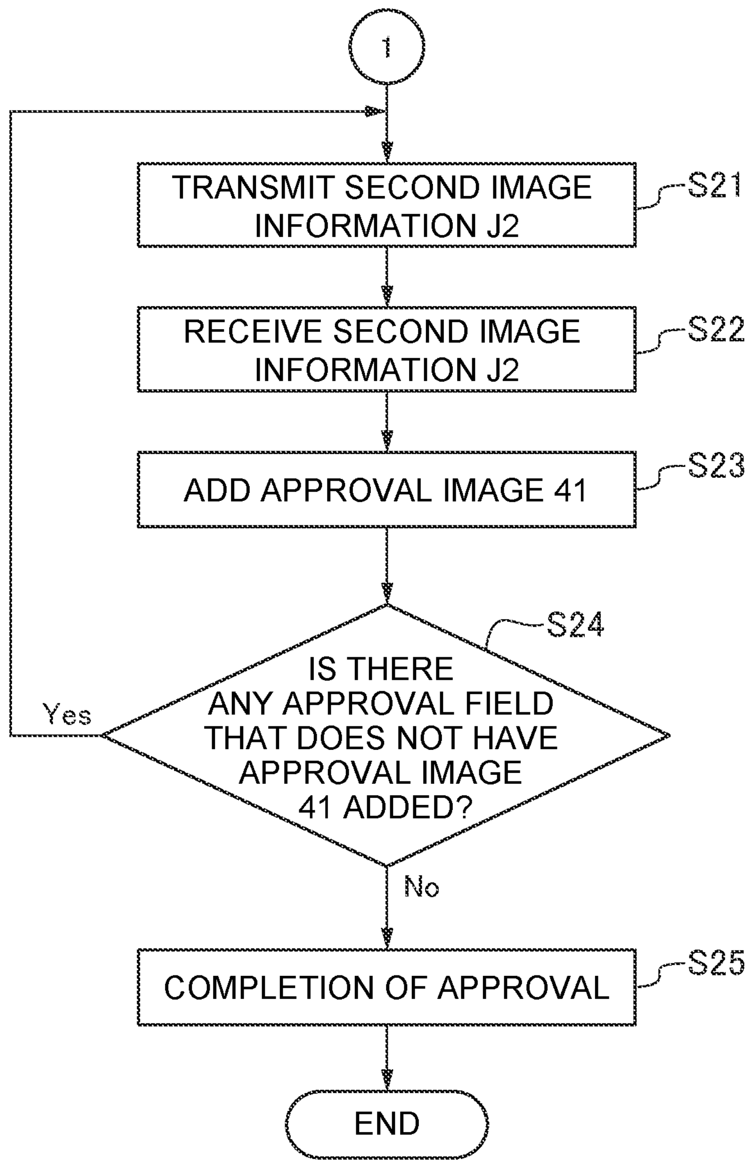
FIG. 11 is a flowchart illustrating the workflow approval method according to the present embodiment.

Next, a workflow approval method according to the present embodiment will be described with reference to FIGS. 10 and 11. FIGS. 10 and 11 are flowcharts illustrating the workflow approval method according to the present embodiment. FIG. 11 is a continuation of FIG. 10.

As illustrated in FIG. 10, first, when the application processing is started in the operation terminal 102, the acquisition unit 11 acquires the first image G1 (step S11).

The region setting unit 12 sets a partial region of the first image G1 as the target region R1 on the basis of the selection information corresponding to the operation of the applicant (step S12).

The recognition unit 14 recognizes the approval fields S1, S2, and S3 included in the first image G1 on the basis of the arrangement of the combination of the characters and frame lines included in the target region R1 of the first image G1 (step S13).

The display processing unit 16 generates approval field images 30A, 30B, and 30C having shapes and sizes respectively corresponding to the approval fields S1, S2, and S3 recognized by the recognition unit 14, and arranges the approval field images at the positions of the approval fields S1, S2, and S3 in the first image G1, thereby generating the second image G2 in which the three approval field images 30 respectively corresponding to the approval fields S1, S2, and S3 are superimposed on the first image G1 (step S14).

In a case where an instruction to change the position of the approval field image 30 in the second image G2 or the size of the approval field image 30 is input, the changing unit 17 changes the position of the approval field image 30 in the second image G2 or the size of the approval field image 30 in accordance with the input instruction (step S15).

The route setting unit 15 sets the approval order D1 indicating the order of approvers who approve the first image G1, on the basis of the array of the approval fields S1, S2, and S3 recognized by the recognition unit 14 (step S16).

The route setting unit 15 refers to the storage unit 13 (step S17), and if the approval route RT1 having an approval order D1 has been stored in the storage unit 13 (Yes in step S17), the route setting unit 15 sets a plurality of pieces of identification information set in the approval route RT1 in the approval order D1. That is, the route setting unit 15 sets the approval route RT1 (step S20). The processing proceeds to step S21 in FIG. 11.

On the other hand, if the approval route RT1 having the approval order D1 has not been stored in the storage unit 13 (No in step S17), the first acceptance unit accepts the input operation of the identification information and the assignment information (step S18).

The route setting unit 15 sets the identification information in the approval order D1 and assigns the target person to the approval order D1, on the basis of the identification information and the assignment information accepted by the first acceptance unit (step S19), and sets the approval route RT1 (step S20). The processing proceeds to step S21 in FIG. 11.

For the target person assigned to the approval route RT, the transmission unit 18 transmits the second image information J2 corresponding to the second image G2 to the first approver in the approval order D1 in accordance with the approval order D1 (step S21).

The reception unit 19 receives the second image information J2 transmitted by the transmission unit 18 (step S22).

When the second acceptance unit 22 accepts the operation performed by the approver, the approval unit 23 generates the approval image 41 indicating the target person and adds the approval image 41 to the approval field corresponding to the target person in the second image G2 (step S23).

When the approval image 41 is added to the approval field, the transmission unit 18 determines the next transmission destination (step S24). If the approval image 41 is not added to the approval field of the next approver of the approver corresponding to the approval field to which the approval image 41 has been added (Yes in step S24), the transmission unit 18 determines the next approver as the transmission destination and transmits the second image information J2 (step S21).

On the other hand, if the approval image 41 is added to all the approval fields (No in step S24), the transmission unit 18 transmits a message notifying the completion of the approval to the applicant (step S25).

In the present embodiment, the target region R1 may not be set. In this case, image processing is performed on the entire first image G1, and the approval field included in the entire first image G1 is recognized. Further, the region setting unit 12 may not be provided in the information processing apparatus 101.

Figure 12:
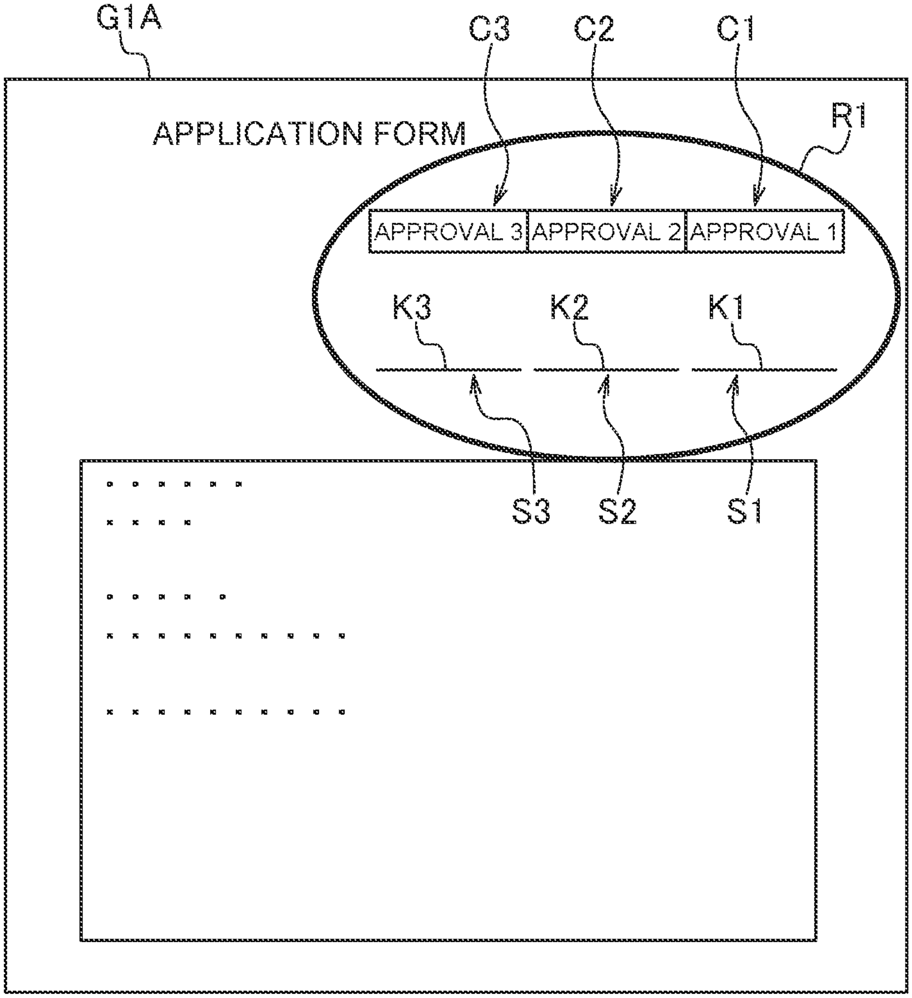
FIG. 12 is a diagram illustrating another example of the first image acquired in the information processing apparatus according to the present embodiment.

In the present embodiment, the delimiting line is not limited to a frame line, and may be a ruled line that divides a predetermined region of the first image G1. FIG. 12 is a diagram illustrating another example of the first image acquired in the information processing apparatus 101 according to the present embodiment. A first image G1A in FIG. 12 is the same as the first image G1 except that a ruled line is included as the delimiting line instead of the frame line. The recognition unit 14 performs image processing on the target region R1 of the first image G1A, and determines that the target region R1 includes three characters C1, C2, and C3 arranged side by side in the horizontal direction and that there are ruled lines K1, K2, and K3 below each of the characters C1, C2, and C3, on the basis of the color and coordinates of each pixel included in the target region R1. The recognition unit 14 recognizes that the region between the ruled line K1 below the character C1 and the character C1 is the approval field S1, the region between the ruled line K2 below the character C2 and the character C2 is the approval field S2, and the region between the ruled line K3 below the character C3 and the character C3 is the approval field S3, on the basis of the positional relation among the three characters C1, C2, and C3 and the ruled lines K1, K2, and K3.

In the present embodiment, the information processing apparatus 101 is a server and is provided as an apparatus different from the operation terminals 102, 103, and 104. However, the information processing apparatus 101 may be provided in any one of the operation terminals 102, 103, and 104.

As described above, the workflow approval system 100 acquires the first image G1 including one or more approval fields, recognizes the approval fields on the basis of the arrangement of the combination of the characters included in the first image G1 and the delimiting line delimiting a predetermined region in the first image G1, and sets the approval order D1 indicating the order of approvers who approve the first image G1, on the basis of the array of the recognized approval fields. Therefore, in the workflow approval system 100, the position of the approval field in the first image G1 can be identified on the basis of the arrangement of the combination of the characters and the delimiting line delimiting the predetermined region in the first image G1 regardless of the arrangement of the approval fields in the first image G1, and thus the approval order can be easily set even if the document does not have a fixed format in which the arrangement of the approval fields is determined in advance.

Further, in the workflow approval system 100, the second image G2 in which the approval field image 30 corresponding to the approval field is superimposed on the first image G1 is displayed on the display device. Thus, for example, the applicant of the workflow can easily determine whether the approval field has been correctly recognized in the workflow approval system 100.

Further, in the workflow approval system 100, at least one of the positions where the approval field image 30 is superimposed on the second image G2 and the shape of the approval field image 30 is changed. Therefore, even when the approval field is erroneously recognized in the workflow approval system 100, the approval field image 30 can be correctly arranged at the position of the approval field.

Further, in the workflow approval system 100, the approval route RT1 in which the target persons are assigned to the approval order D1 as the approvers corresponding to the approval fields is stored, and the second image information J2 corresponding to the second image G2 is transmitted to the approvers assigned to the approval route RT1 in accordance with the approval order D1. In this way, the second image information J2 is sequentially transmitted to the approvers assigned to the approval route RT1, and thus it is possible to prevent the second image information J2 from being transmitted in a wrong order of the approvers or to prevent the second image information J2 from being transmitted to persons other than the approvers.

Further, in the workflow approval system 100, the input identification information is assigned as the target person in accordance with the accepted input operation. Therefore, the applicant of the workflow can select any target person as the approver.

Further, in the workflow approval system 100, when the operation of the approver who has received the second image information J2 is received, the approval image is added to the approval field corresponding to the approver who has received the second image information J2 among one or more approval fields included in the second image G2, and the second image information J2 is transmitted to the next approver. In this way, the addition of the approval image and the transmission of the second image information J2 are performed by the operation of the approver, and thus the approval process by the approver becomes easier.

Further, in the workflow approval system 100, when the newly set approval order D2 is the same as the approval order D1 of the stored approval route RT1, the target person assigned to the approval route RT1 is selected as the approver. Therefore, the approver in the approval route RT1 previously set is set in the approval order D2, and thus the work by the applicant can be reduced.

Further, in the workflow approval system 100, a partial region of the first image G1 is set as the target region R1, and one or more approval fields included in the target region R1 are recognized. In this way, the recognition accuracy of the approval field can be improved by limiting the range in which the approval field is arranged.

The embodiment of the present disclosure has been described above with reference to the drawings. However, the present disclosure is not limited to the embodiment described above, and can be implemented in various forms without departing from the gist thereof. Further, a plurality of components disclosed in the embodiment described above can be modified as appropriate. For example, a certain component among all the components described in a certain embodiment may be added to the components of another embodiment or some components among all the components described in a certain embodiment may be deleted from the embodiment.

For ease of understanding of the present disclosure, the drawings are schematically illustrated mainly on the individual components, and the thicknesses, the lengths, the numbers, the intervals and the like of the components illustrated in the drawings may be different from the actual values for convenience of production of the drawings. The configurations of the components in the embodiment described above are examples, the present disclosure is not particularly limited and it is needless to say that various modifications can be made without substantially departing from the effects of the present disclosure.

The invention claimed is:

1. A workflow approval system comprising:

an operation terminal that accepts an operation of a user or each of a plurality of approvers; and an information processing apparatus comprising a processor and a storage device that stores one or more instructions for an approval process, the processor configured to execute the one or more instructions to:

acquire a first image in response to the operation of the user on the operation terminal, recognize one or more combinations of characters included in the first image and a frame line below the characters, recognize the frame line as a plurality of approval fields, recognize an array of the plurality of approval fields based on an arrangement of the one or more combinations of characters in the first image, set an approval order indicating an order of the plurality of approvers who approve the first image based on the array of the plurality of approval fields, and store the approval order in the storage device as an approval route, such that a first target person is assigned to the approval route, as one of the plurality of approvers corresponding to the plurality of approval fields, display, on a display device, a second image in which an approval field image corresponding to the recognized array of the plurality of approval fields is superimposed on the first image, transmit second image information, corresponding to the second image, to the first target person, assigned to the approval route, in accordance with the approval order, wherein the operation terminal receives the second image information transmitted from the information processing apparatus, and accepts an operation selected by the first target person, add an approval image to an approval field, among the plurality of approval fields, included in the second image corresponding to the second image information, wherein the approval image is associated with the first target person in a case that the operation selected by the first target person is accepted, in a case that the approval image is added, transmit the second image information to a second target person corresponding to an approval field to which the approval image is not added, and in a case that approval images have been added to all of the plurality of approval fields, terminate the approval process.

2. The workflow approval system according to claim 1, wherein:

the processor is further configured to execute the one or more instructions to change at least one of a position at which one or more approval field images, including the approval field image, are superimposed, and a shape of the one or more approval field images.

3. The workflow approval system according to claim 1, wherein:

the processor is further configured to execute the one or more instructions to:

accept an input operation of inputting identification information indicating the first target person on the operation terminal, and assign the accepted identification information to the approver as the first target person.

4. The workflow approval system according to claim 1, wherein:

in a case that a newly set approval order is the same as the approval order of the approval route stored in the storage device, the processor is further configured to execute the one or more instructions to select the first target person assigned to the approval route stored in the storage device as the approver.

5. The workflow approval system according to claim 1, wherein:

the processor is further configured to execute the one or more instructions to:

set a partial region of the first image as a target region, and recognize the plurality of approval fields included in the target region based on an arrangement of a combination of characters and a frame line included in the target region.

6. A workflow approval method comprising:

acquiring a first image in response to an operation of a user or each of a plurality of approvers;

recognizing one or more combinations of characters included in the first image and a frame line below the characters;

recognizing the frame line as a plurality of approval fields;

recognizing an array of the plurality of approval fields based on an arrangement of the one or more combinations of characters in the first image;

setting an approval order indicating an order of the plurality of approvers who approve the first image, based on the array of the plurality of approval fields; and storing the approval order in a storage device as an approval route, such that a first target person is assigned to the approval route, as one of the plurality of approvers corresponding to the plurality of approval fields, displaying, on a display device, a second image in which an approval field image corresponding to the recognized array of the plurality of approval fields is superimposed on the first image, transmitting second image information, corresponding to the second image, to the first target person assigned to the approval route, in accordance with the approval order, wherein the operation terminal receives the second image information transmitted from the information processing apparatus, and accepts an operation selected by the first target person, adding an approval image to an approval field among the plurality of approval fields included in the second image corresponding to the second image information, wherein the approval image is associated with the first target person in a case that the operation selected by the first target person is accepted, in a case that the approval image is added, transmitting the second image information to a second target person corresponding to an approval field to which the approval image is not added, and in a case that approval images have been added to all of the plurality of approval fields, terminating the approval process.

7. A non-transitory computer-readable storage medium that stores one or more instructions for causing a computer to execute the workflow approval method according to claim 6.

* * * * *